US012639803B2

(12) United States Patent
Karigiannis et al.

(10) Patent No.: US 12,639,803 B2
(45) Date of Patent: May 26, 2026

(54) SYSTEMS AND METHODS FOR MATERIAL ACCRETION DETECTION AND REMOVAL

(71) Applicant: GE Infrastructure Technology LLC, Greenville, SC (US)

(72) Inventors: John Karigiannis, Laval (CA); Arpit Jain, Fremont, CA (US); Raju D. Venkataramana, Camas, WA (US); Jose Antonio Cuevas Alvarez, Turgi (CH); David Michael Boehmer, Atlanta, GA (US); Sam Van Orman, Atlanta, GA (US)

(73) Assignee: GE Infrastructure Technology LLC, Greenville, SC (US)

( * ) Notice: Subject to any disclaimer, the term of this patent is extended or adjusted under 35 U.S.C. 154(b) by 293 days.

(21) Appl. No.: 18/348,495

(22) Filed: Jul. 7, 2023

(65) Prior Publication Data

US 2025/0014168 A1     Jan. 9, 2025

(51) Int. Cl.
*G06T 7/00*     (2017.01)
*F01D 25/02*     (2006.01)

(52) U.S. Cl.
CPC .............. *G06T 7/001* (2013.01); *F01D 25/02* (2013.01); *F05D 2270/8041* (2013.01)

(58) Field of Classification Search
None
See application file for complete search history.

(56) References Cited

U.S. PATENT DOCUMENTS

| | | | |
|---|---|---|---|
| 7,439,877 B1 * | 10/2008 | Jarvinen | B64D 15/20 |
| | | | 340/581 |
| 9,097,657 B2 | 8/2015 | Xu | |
| 9,170,193 B2 | 10/2015 | Xu et al. | |
| 9,567,907 B2 | 2/2017 | Bhabhrawala | |
| 9,759,630 B2 | 9/2017 | Xu et al. | |
| 9,874,109 B2 | 1/2018 | Clifford, Jr. et al. | |
| 10,495,545 B2 | 12/2019 | Moore et al. | |

(Continued)

FOREIGN PATENT DOCUMENTS

EP     3214519 B1     4/2020

OTHER PUBLICATIONS

Myshkin, Nikolai K., and Liubou V. Markova. "Wear prediction for tribosystems based on debris analysis." On-Line Condition Monitoring in Industrial Lubrication and Tribology. Cham: Springer International Publishing, 2017. 131-201. (Year: 2017).*

(Continued)

*Primary Examiner* — Michelle M Entezari Hausmann

(74) *Attorney, Agent, or Firm* — Armstrong Teasdale LLP

(57) ABSTRACT

A system for monitoring at least one component is provided. The system includes at least one processor in communication with at least one memory device. The at least one processor is programmed to store a plurality of baseline information associated with the at least one component to be monitored and receive a plurality of current images of the at least one component to be monitored. The at least one processor is also programmed to detect a deviation from baseline based upon a comparison of the plurality of current images and the plurality of baseline information. The at least one processor is further programmed to classify the deviation and implement a corrective action based on the classification of deviation.

20 Claims, 9 Drawing Sheets

(56)     References Cited

U.S. PATENT DOCUMENTS

| | | | |
|---|---|---|---|
| 10,508,597 B2 | 12/2019 | Kalya et al. | |
| 11,145,202 B1 * | 10/2021 | Buentello | G08G 1/141 |
| 12,147,944 B2 * | 11/2024 | Malkan | G05B 23/0235 |
| 2015/0047368 A1 | 2/2015 | Jones et al. | |
| 2017/0090458 A1 | 3/2017 | Lim et al. | |
| 2018/0321386 A1 * | 11/2018 | Bosetti | G01S 17/95 |
| 2018/0336674 A1 * | 11/2018 | Lim | G06V 20/64 |
| 2019/0146000 A1 | 5/2019 | Hurst et al. | |
| 2019/0225346 A1 * | 7/2019 | Calmels | G06N 5/01 |
| 2021/0071897 A1 * | 3/2021 | Casa | G05B 23/0283 |
| 2021/0372375 A1 * | 12/2021 | Schaper | F03D 7/04 |
| 2023/0152792 A1 * | 5/2023 | Mears | G05B 23/0224 |
| | | | 700/109 |
| 2023/0219698 A1 * | 7/2023 | Campbell | B64D 43/00 |
| | | | 701/3 |
| 2025/0390845 A1 * | 12/2025 | Upadhya | G06Q 10/20 |

OTHER PUBLICATIONS

Laninga, J., Nasr Esfahani, A., Ediriweera, G., Jacob, N. and Kordi, B., 2023. Monitoring technologies for HVDC transmission lines. Energies, 16(13), p. 5085. (Year: 2023).*

European Search Report received for 24181920 on Nov. 13, 2024; 9 pps.

* cited by examiner

OPTICAL SENSOR
405

DEVICE SENSORS
318

400

DATABASE SERVER
415

DEVIATION MONITORING SYSTEM (DMS) SERVER
320

DATABASE
420

MITIGATION SYSTEM
326

DEVICE CONTROL SYSTEM
410

CLIENT DEVICE
328

SYSTEMS AND METHODS FOR MATERIAL ACCRETION DETECTION AND REMOVAL

BACKGROUND

The field of the invention relates generally to material accretion detection and removal and, more specifically, to systems that detect the accumulation and accretion of undesirable materials on machines and devices, such as turbines.

Components and subassemblies of industrial machines and devices are routinely inspected for wear, potential defects, and the accumulation of foreign material. However, while the equipment, such as a turbine, is in operation, it may be difficult to detect the accumulation of ice on the equipment to enable de-icing systems to activate only when necessary to prevent icing damage to the equipment. Damage from icing events may be expensive and time-consuming to repair. Additionally, current conservative icing boundaries may cause unnecessary de-icing events and/or other modifications to the operation of the devices that generally decrease user power output and/or performance. Furthermore, many current detection systems rely primarily on theoretical curves that can change based on the equipment model and/or the operating conditions. Accordingly, it would be desirable to have a system that facilitates improving the detection of material accumulation and accretion, in a manner that is independent of the specific device model and/or operating geometries.

BRIEF DESCRIPTION

In one aspect, a system for monitoring at least one component is provided. The system includes at least one processor in communication with at least one memory device. The at least one processor is programmed to store a plurality of baseline information associated with the at least one component to be monitored and receive a plurality of current images of the at least one component to be monitored. The at least one processor is also programmed to detect a deviation from baseline based upon a comparison of the plurality of current images and the plurality of baseline information. The at least one processor is further programmed to classify the deviation and implement a corrective action based on the classification of deviation. The system may include additional or alternative functionality, including that discussed elsewhere herein.

In another aspect, a method for monitoring at least one component within a device is provided. The method is implemented on a computer system including at least one processor in communication with at least one memory device. The method includes storing a plurality of baseline information associated with the at least one component to be monitored and receiving a plurality of current images of the at least one component to be monitored. The method also includes detecting a deviation from baseline based upon the plurality of current images and the plurality of baseline information. The method further includes classifying the deviation and implementing a corrective action based on the classification of deviation. The method may include additional, or alternative functionality, including that discussed elsewhere herein.

Advantages will become more apparent to those skilled in the art from the following description of the preferred embodiments which have been shown and described by way of illustration. As will be realized, the present embodiments may be capable of other and different embodiments, and their details are capable of modification in various respects.

Accordingly, the drawings and description are to be regarded as illustrative in nature and not as restrictive.

BRIEF DESCRIPTION OF THE DRAWINGS

The Figures described below depict various aspects of the systems and methods disclosed therein. It should be understood that each Figure depicts an embodiment of a particular aspect of the disclosed systems and methods, and that each of the Figures is intended to accord with a possible embodiment thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present embodiments are not limited to the precise arrangements and are instrumentalities shown, wherein.

Figure 1:
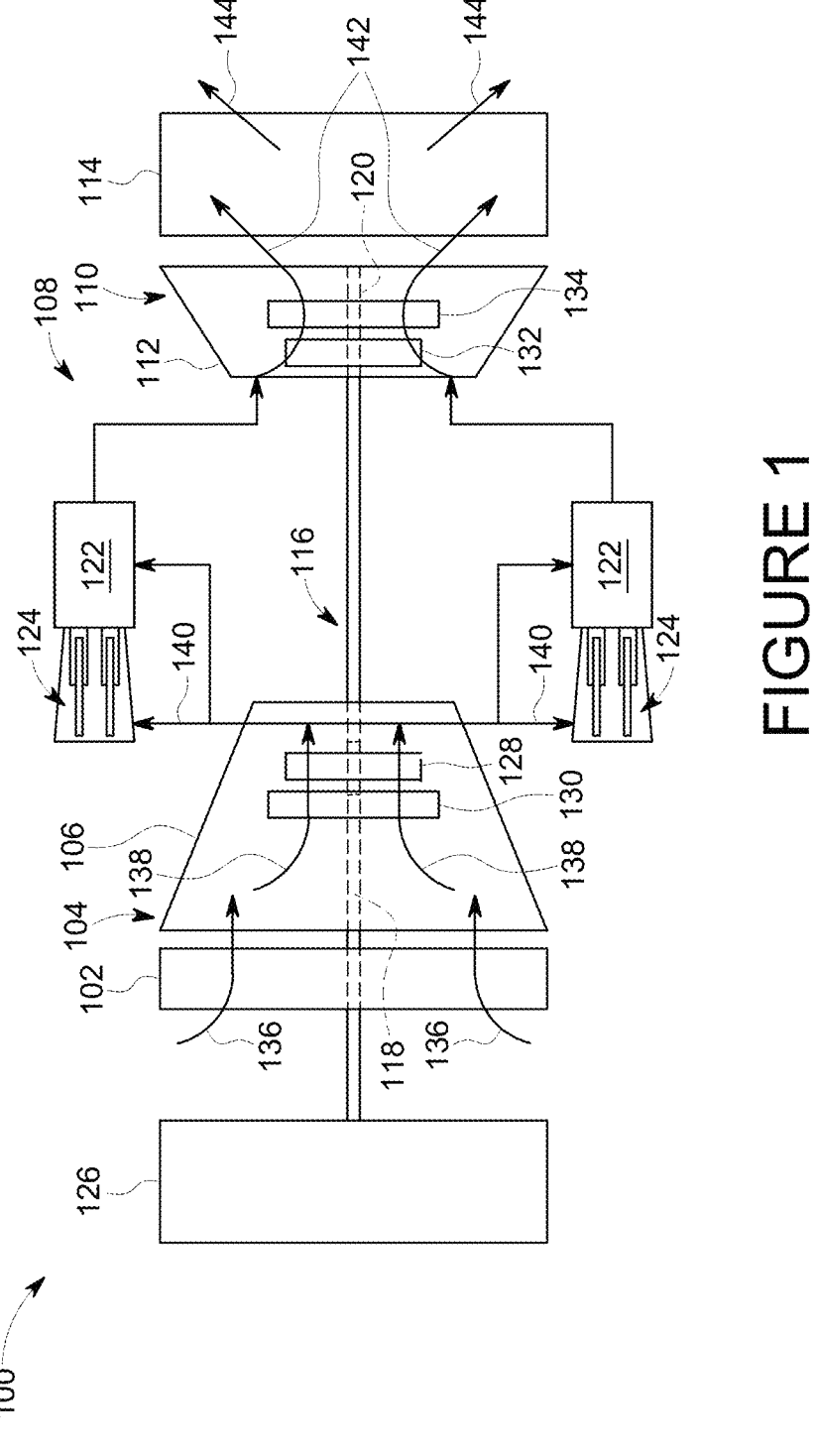
FIG. 1 is a schematic view of an exemplary high-value asset, i.e., a turbomachine, and more specifically, in the exemplary embodiment, is a view of a turbine engine.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

The present embodiments may relate to, inter alia, material accretion detection and removal and, more specifically, to systems that detect accumulation and accretion of undesirable materials on machines and devices, such as turbines, for example. In one exemplary embodiment, the process may be performed by a deviation monitoring system ("DMS") computer device. In the exemplary embodiment, the DMS computer device may be in communication with one or more client devices, one or more control systems, and/or sensors monitoring the machine and/or device.

In the exemplary embodiment, the system includes an optical camera and an illumination system mounted on a gas turbine (GT) inlet plenum. The DMS computer device receives images from the optical camera. The system may also, alternatively or additionally, use other imaging equipment, such as, but not limited to, thermal cameras and/or spectroscopes. The DMS computer device analyzes the images in real-time to detect deviations as compared to a baseline associated with the GT. For example, the DMS computer device may estimate ice accumulation on the compressor blades (e.g., inlet guide vanes—IGV) based on the comparison. The DMS computer device differentiates between glaze and rime ice, and based on an amount of ice detected, the DMS computer device autonomously recommends action(s) to control anti-icing/de-icing of the system. In some embodiments, the DMS computer device may actively control and/or activate the anti-icing system.

In at least one embodiment, the DMS computer device includes one or more machine learning (ML) trained models that are programmed to detect and identify material accreted and/or accumulated on the machine based on the images provided by the camera(s). In some embodiments, the DMS computer device also receives information from one or more additional sensors that facilitate the identification of accumulation and that provide context and additional information. Such additional sensors may include sensors that measure, but are not limited to only including sensors that measure, rotor speed, temperature, pressure, humidity, altitude, position, and/or any other operating variable that may assist in making the accumulation identification as described herein. The DMS computer device combines the different sensor modalities to autonomously detect any deviation from the baseline, subsequently in real-time characterizes the type of deviations, performs quantification of the deviation, and communicates with one or more control systems.

The DMS computer device "trains" the one or more models to detect, classify, and quantify deviations from the baseline of the machine and/or device. The DMS computer device monitors the machine, such as the GT inlet and compressor, and detects any deviation from the baseline. The DMS computer device, in real-time, characterizes the type of deviation (e.g., ice accrual). "Real-time" refers to either the time of occurrence of the associated events, the time of measurement and collection of predetermined data, the time to process the data, or the time of a system response to the events and the environment. In the embodiments described herein, these activities and events occur substantially instantaneously. The DMS computer device performs quantification of the deviation (e.g., area impacted, blades, etc.). The DMS computer device determines when and/or if preventative and/or corrective actions should be performed. More specifically, in the exemplary embodiment, the DMS computer device determines when the control system of the machine should be activated to implement one or more preventative and/or corrective actions. Such corrective actions may entail activating de-icing systems that uses high temperature inlet bleed air. Further corrective actions include, but are not limited to, increasing rotational speed, directing or scheduling a maintenance to repair a leak detected, directing or scheduling an in-line wash.

In some embodiments, the DMS computer system operates in a closed loop, with the DMS computer system controlling and/or initiating preventative and/or corrective actions. In other embodiments, the DMS computer system operates in an open loop, with the DMS computer system notifying operators of the conditions of the identified devices and/or machines that are at risk of accumulation, and the need for corrective and/or preventative actions.

In some embodiments, the DMS computer system is an edge-based computer system. Edge-based computer systems allow devices in remote locations to process data at the "edge" of the network, either by the device or a local server.

Additionally, when data needs to be processed in the central datacenter, only the most important data is transmitted, thereby minimizing latency. In other embodiments, the DMS computer system is configured as a cloud-based computational architecture enabling both local and fleet management.

While the above describes using the systems and processes described herein for monitoring accretion of material on machines and devices, one having skill in the art would understand that these systems and methods may also be used for classifying and quantifying deviations from baseline for machines and/or devices, such as, but not limited to, damage to one or more parts of the machine, a calibration need for one or more parts of the machine, missing parts of the machine, leaks, and/or other variations and/or deviations from the baseline of a machine and/or device.

At least one of the technical problems addressed by this system may include: (i) detecting early and/or estimating the formation of ice and other materials; (ii) enabling de-icing systems or other countermeasures to activate only when necessary to avoid damage to the machine, thus facilitating reducing unnecessary activation of such systems or countermeasures; (iii) improving user power output and performance at various loads by removing conservative icing boundaries; (iv) improving analytics and digital capability of monitoring tools; (v) providing monitoring coverage to individual devices and/or fleets; (vi) improving accuracy of material accumulation on operating machinery; and/or (vii) significantly reducing the need for human intervention and monitoring while devices are in operation.

A technical effect of the systems and processes described herein may be achieved by performing at least one of the following steps: a) storing a plurality of baseline information for one or more components to be monitored; b) receiving a plurality of current images of the one or more components to be monitored; c) detecting a deviation from baseline based upon the plurality of images and the plurality of baseline information; d) executing at least one classification model to generate a classification the deviation; e) determining an amount of deviation based upon the classification of the deviation; and f) activating at least one mitigation system based upon the determined amount of deviation.

The monitoring method and systems described herein provide for accurate prediction of the lifetime of components. Furthermore, the method and systems described herein facilitate the accurate prediction of potential failure points of those components. In addition, the system and methods described herein are not limited to any single component, but may be implemented with any component of a device that is subject to wear and/or that is subject to accumulation of undesirable materials. For example, the methods and systems described herein may be used with any components of aircraft, wind turbines, locomotives, power systems, automobiles, and/or other devices that include components subject to wear and/or the accumulation of undesirable materials. By aggregating the data about the lifecycle of a plurality of components of the same type, operating lifetimes and maintenance schedules are more accurately generated.

FIG. 1 is a schematic view of an exemplary high-value asset, i.e., a turbomachine, and more specifically, in the exemplary embodiment, is a view of a turbine engine 100. Alternatively, any other apparatus, system, and facility that may be subject to maintenance because of components that may be monitored and subjected to wear and/or the accumulation of undesirable materials may be subject to the method and systems described herein, including, without limitation, combustion systems such as furnaces, gasification systems, boilers, turbines, geared devices, and/or high-temperature exhaust systems.

In the exemplary embodiment, gas turbine engine 100 includes an air intake section 102 and a compressor section 104 coupled downstream from, and in flow communication with, air intake section 102. Compressor section 104 is enclosed within a compressor casing 106. A combustor section 108 is downstream from, and in flow communication with, compressor section 104, and a turbine section 110 is downstream from, and in flow communication with, combustor section 108. Gas turbine engine 100 is enclosed within a turbine casing 112 and includes an exhaust section 114 downstream from turbine section 110. Moreover, in the exemplary embodiment, turbine section 110 is coupled to compressor section 104 via a rotor assembly 116 that includes, without limitation, a compressor rotor, or drive shaft 118 and a turbine rotor, or drive shaft 120.

In the exemplary embodiment, combustor section 108 includes a plurality of combustor assemblies, i.e., combustors 122 that are each coupled in flow communication with compressor section 104. Combustor section 108 also includes at least one fuel nozzle assembly 124. Each combustor 122 is in flow communication with at least one fuel nozzle assembly 124. Moreover, in the exemplary embodiment, turbine section 110 and compressor section 104 are rotatably coupled to a load 126 via drive shaft 118. Load 126 may, for example, include, without limitation, an electrical generator or a mechanical drive application, e.g., a pump. Alternatively, gas turbine engine 100 may be an aircraft engine. In the exemplary embodiment, compressor section 104 includes at least one rotatable compressor blade assembly 128, i.e., one or more blades 128 and at least one adjacent stationary vane assembly 130.

Also, in the exemplary embodiment, turbine section 110 includes at least one rotatable turbine blade assembly, i.e., turbine bucket 132, and at least one adjacent stationary nozzle assembly 134. Each compressor blade assembly 128 and each turbine bucket 132 are coupled to rotor assembly 116, or, more specifically, drive shaft 118 of the compressor and drive shaft 120 of the turbine.

In operation, air intake section 102 channels inlet air 136 towards compressor section 104. Compressor section 104 compresses inlet air 136 to higher pressures and temperatures prior to discharging compressed air 138 towards combustor section 108. Compressed air 140 is channeled to fuel nozzle assembly 124, mixed with fuel (not shown), and burned within each combustor 122 to generate combustion gases 142 that are channeled downstream towards turbine section 110. Combustion gases 142 generated within combustors 122 are channeled downstream towards turbine section 110. After impinging turbine bucket 132, thermal energy is converted to mechanical rotational energy that is used to drive the rotor assembly 116. Turbine section 110 drives compressor section 104 and load 126 via drive shafts 118 and 120, and exhaust gases 144 are discharged through exhaust section 114 to ambient atmosphere.

Figure 2:
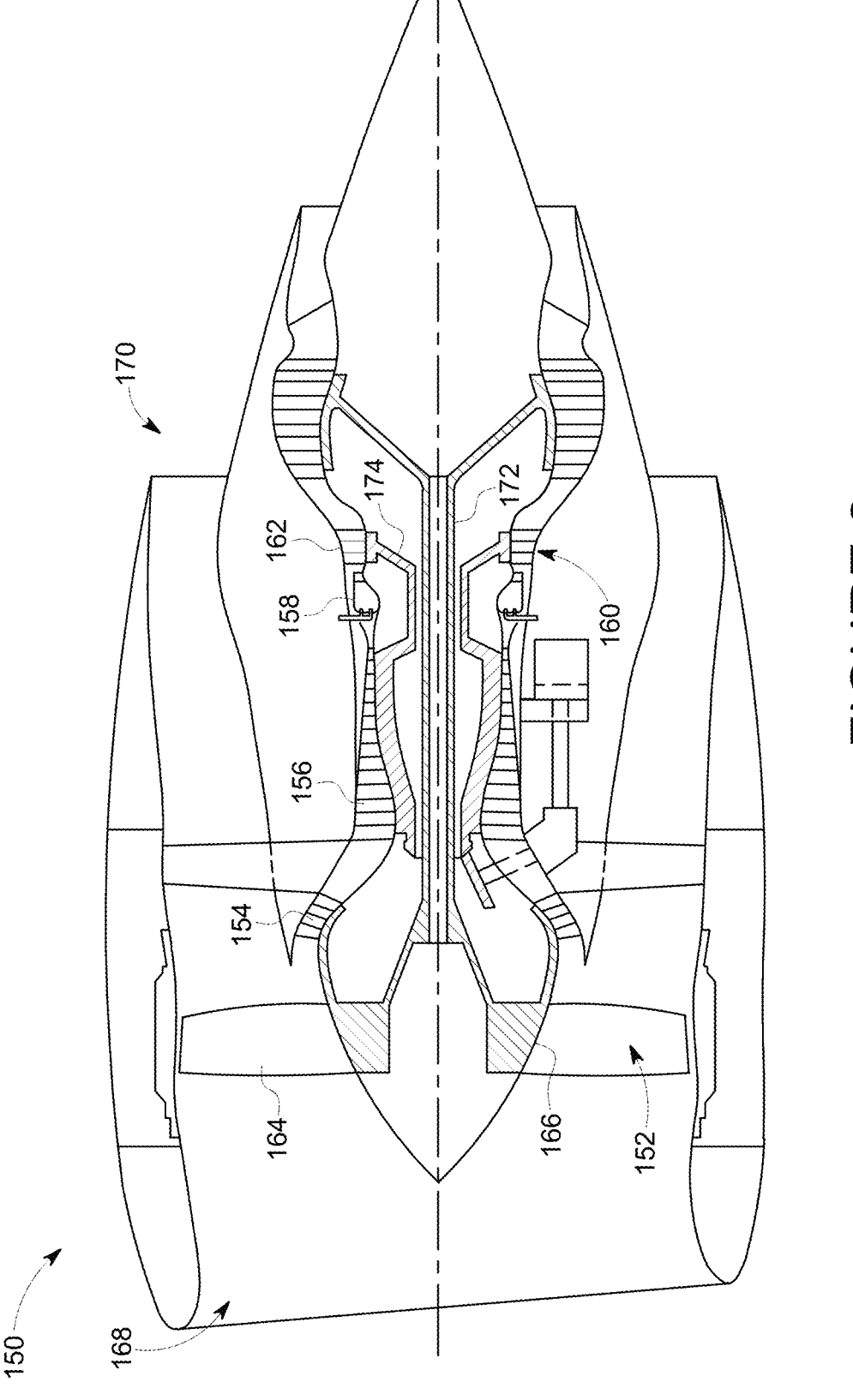
FIG. 2 is a schematic illustration of an exemplary gas turbine engine.

FIG. 2 is a schematic illustration of an exemplary gas turbine engine, and more specifically, in the exemplary embodiment, a jet turbine engine 150. In the exemplary embodiment, jet turbine engine 150 includes a fan assembly 152, a booster 154, a high pressure compressor 156, and a combustor 158. Jet turbine engine 150 also includes a high pressure turbine 160, and a low pressure turbine 162, all of which are coupled in a serial flow arrangement. Fan assembly 152 includes an array of rotatable fan blades 164 that extend radially outward from a rotor disk 166. Turbine engine 150 also includes an intake side 168 and an exhaust side 170. In the exemplary embodiment, turbine engine 150 may be, but is not limited to being, a LEAP or P20 gas turbine engine commercially available from General Electric Company, Cincinnati, Ohio. Fan assembly 152, booster 154, and low pressure turbine 162 may be coupled via a first rotor shaft 172, and the high pressure compressor 156 and the high pressure turbine 160 may be coupled via a second rotor shaft 174.

In operation, air flows through fan assembly 152 and compressed air is supplied to high pressure compressor 156 through booster 154. The highly compressed air is delivered to combustor 158, wherein the air is mixed with a fuel and ignited to generate combustion gases. The combustion gases are channeled from the combustor 158 to drive the high pressure turbine 160 and the low pressure turbine 162. The low pressure turbine 162 drives the fan assembly 152 and booster 154 by way of first rotor shaft 172. The high pressure turbine 160 drives the high pressure compressor 156 via second rotor shaft 174. In at least the exemplary embodiment, the plurality of components includes blade 164.

FIGS. 1 and 2 are described for illustrative purposes to illustrate exemplary devices that may be subject to the accumulation and accretion of undesirable materials, such as ice, snow, dust, dirt, and/or oil, etc. Turbine engine 100 and jet turbine engine 150 both include a plurality of components that may be subject to wear and that may be adversely affected by the accumulation and accretion of materials. For example, compressor blade assembly 128, including one or more blades 128 and stationary vane assembly 130 in turbine engine 100, and blade 164 in jet turbine engine 150, are non-limiting examples of exemplary components that may be subject to wear and/or that may be affected by the accumulation and accretion of undesirable materials. In the exemplary embodiment, the determination of whether to implement at least one corrective and/or preventative measure is determined in view of the current operating condition of the component being monitored. As will be described further in this disclosure, determining any changes to the baseline of components of machines and/or devices in real-time enables timely action to correct potential issues. For example, if a comparison between the baseline and a current image of the components of the machine reveals the accumulation of what is identified and quantified as an amount of ice on the components that exceeds a pre-defined threshold, depending on predefined protocols, the system may activate at least one de-icing countermeasure. As used herein, an amount of ice accumulation that exceeds a pre-defined threshold may be referred to as "potentially harmful."

Figure 3:
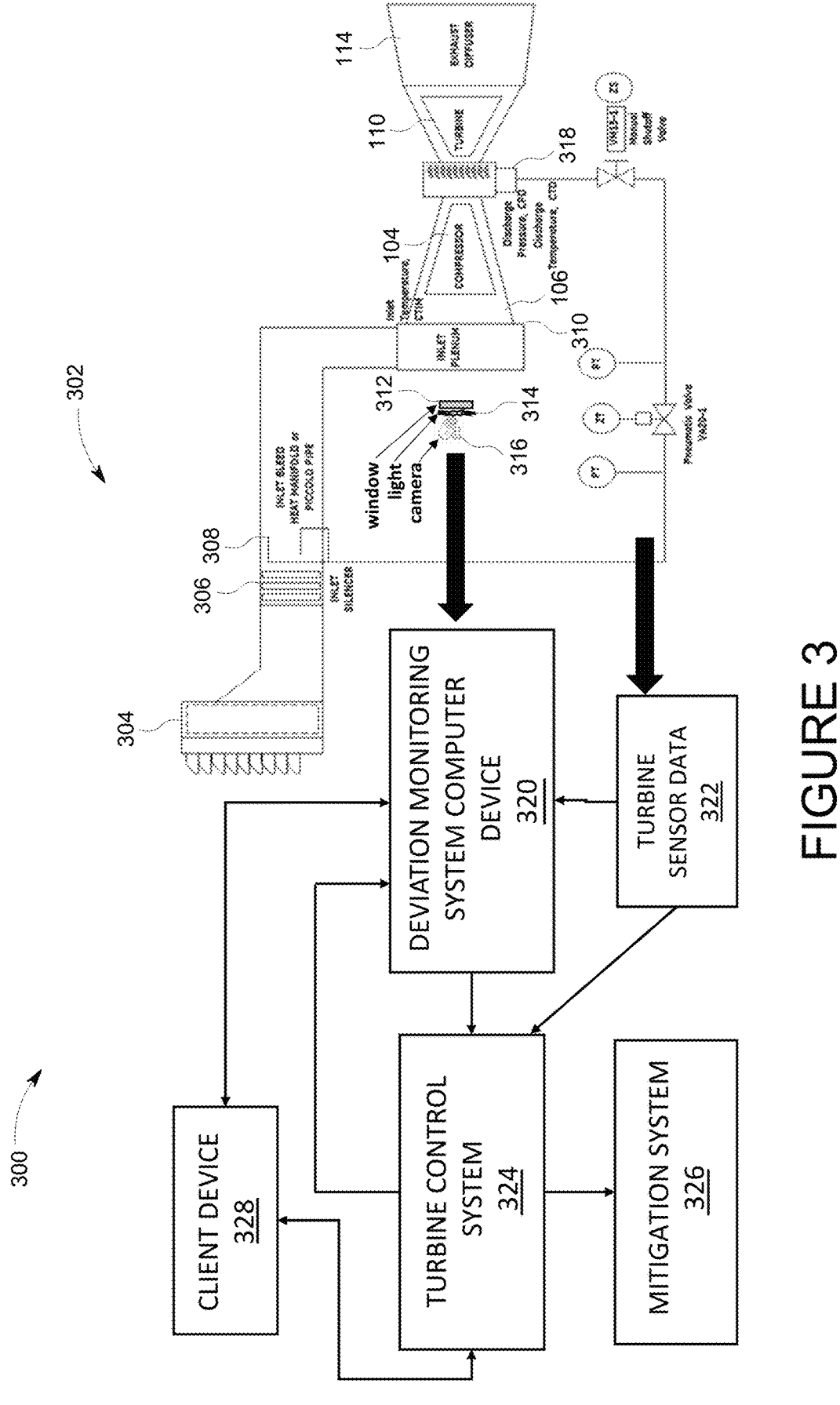
FIG. 3 illustrates an exemplary system for use in monitoring the operation of a turbine as shown in FIGS. 1 and 2.

FIG. 3 illustrates an exemplary system 300 that may be used for monitoring the operation of a turbine 100 and 150 (shown in FIGS. 1 and 2). System 300 illustrates one monitoring system in accordance with at least one embodiment. In the exemplary embodiment, within system 300, the compressor section 104 is being monitored.

As shown in FIG. 3, in the exemplary embodiment, the turbine 100 and 150 includes an inlet system 302 that expands on air intake section 102 (shown in FIG. 1). Inlet system 302 includes an airduct 304 including inlet silencers 306, which in the exemplary embodiment, may be one or more sections of parallel baffles, followed by a heat manifold or piccolo pipe 308. In at least one embodiment, the inlet silencers 306 are of a baffle-type construction that facilitates attenuating the high frequency noise in the air inlet, caused by the rotating compressor blading. The airduct 304 leads to a gas turbine inlet plenum 310 that contains the compressor casing 106.

A window 312 or other aperture is defined in the wall of the gas turbine inlet plenum 310. The window 312 enables a lighting system 314 to illuminate the compressor section 104 including the one or more blades 128 and stationary vane assembly 130 of the compressor section 104. A camera 316 and/or any other optical sensor that enables systems 300 and 400 to function is able to view the compressor section 104 through the window 312 and to gather images of the compressor section 104 during operation. In some embodiments, the camera 316 may be at least one of, but is not limited to only being, an optical camera, a thermal camera, and a spectroscope. The images and other sensor information are transmitted to a deviation monitoring system (DMS) computer device 320. The images and other sensor information may include infrared and/or spectral imaging information.

In at least some embodiments, device sensors 318 coupled about the turbine 100 and 150 may collect additional turbine sensor data 322 about the turbine 100 and 150, such as, but not limited to, discharge pressure, compressor discharge pressure, discharge temperature, IGV position, rotor speed, temperature, pressure, and/or the humidity. The DMS computer device 320 receives the turbine sensor data 322, and in some embodiments, the DMS computer device 320 uses the turbine sensor data 322 to determine context about the component being monitored based on the images transmitted by the camera 316. For example, ice may only form at particular temperature ranges and/or humidity ranges. If the current operating environmental temperature and/or humidity measured via the turbine sensor data 322 is not within the predefined ranges wherein ice accumulation may occur, the DMS computer device 320 uses that information to determine what material is accumulating on the compressor section 104.

In the exemplary embodiment, the DMS computer system 320 communicates with a turbine control system 324. The turbine control system 324 controls the operation of the turbine 100 or 150. Accordingly, the turbine control system 324 also receives the turbine sensor data 322 transmitted from the device sensors 318.

In the exemplary embodiment, the turbine control system 324 also controls one or more mitigation systems 326. The mitigations systems 326 are configured to correct and/or prevent conditions of the components being monitored within turbine 100 and/or 150 that may be adversely affected by the accretion or accumulation of material, such as, but not limited to, ice, snow, dust, dirt, and/or oil. In some embodiments, the mitigation system 326 causes turbine 100 and/or 150 to increase its operating speed to facilitate dispersing the accreted material.

In the exemplary embodiment, the turbine control system 324 also communicates with one or more client devices 328. Client devices 328 are associated with individual users and/or groups of users. In at least one embodiment, the turbine control system 324 transmits information about the operation of the turbine 100 and 150 to users via their client devices 328. In some of these embodiments, the information is presented via a user interface, such as through a dashboard. In at least one embodiment, some of the information includes the turbine sensor data 322.

In the exemplary embodiment, the DMS computer device 320 receives the images from the camera 316 and in response, analyzes the images to determine if any accretion or accumulation of material is on the compressor section

104, or other component being monitored, based on a comparison to a baseline. The DMS computer device 320 then classifies and determines what material has been detected. In some embodiments, the DMS computer device 320 classifies and determines the material based upon the turbine sensor data 322. The DMS computer device 320 also quantifies the material detected and determines if the amount of material that has accumulated exceeds at least one predetermined threshold. If the threshold has been satisfied or exceeded, the DMS computer device 320 instructs the turbine control system 324 to activate the mitigation system 326.

In the exemplary embodiment, the DMS computer device 320 continues to monitor the compressor section 104 after the mitigation system has been activated to determine when the mitigation is complete, and when to cause the turbine control system 324 to deactivate the mitigation system 326. In such embodiments, the DMS computer device 320 determines that the mitigation system 326 should be deactivated, when the quantity of material remaining, as determined by subsequent comparisons between additional images gathered and the predefined threshold, is below a deactivation or low-risk threshold. Alternatively, and/or in addition, the DMS computer device 320 may notify the user via the client device 328 of a risk of potentially damaging accumulation and the need to activate the mitigation system 326. In response, depending on predetermined operating protocols, the user either instructs the turbine control system 324 to activate the mitigation system 326, or activates the mitigation system themselves.

Figure 4:
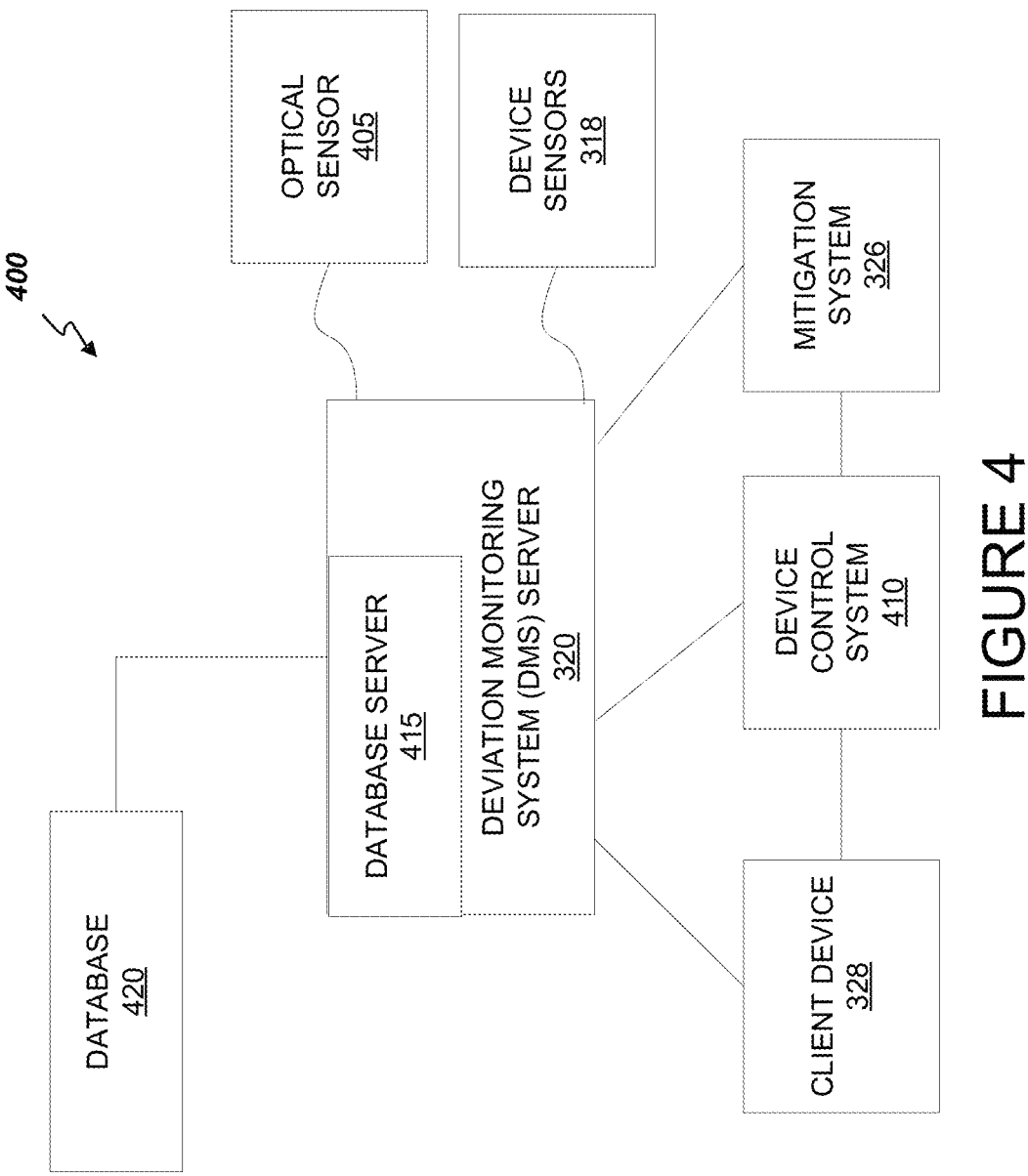
FIG. 4 illustrates an exemplary computer system that may be used with the system shown in FIG. 3.

FIG. 4 illustrates an exemplary computer system 400 that may be used with the system 300 (shown in FIG. 3). In the exemplary embodiment, the system 400 monitors the accretion and/or accumulation of material on one or more components of a machine and/or device. In some embodiments, the system 400 analyzes the images of a component to determine one or more conditions of that component. In addition, the system 400 is a deviation monitoring system (DMS) computer device 320 that detects, classifies, and quantifies deviations from baseline.

As described herein in more detail, the DMS computer device 320 (also known as a DMS server 320) is programmed to analyze images to detect, classify, and quantify deviations from a baseline. In addition, the DMS server 320 is programmed to continuously update and "train" one or more models used to detect, classify, and quantify deviations from baseline from images and other sensor information. The DMS server 320 is programmed to a) store a plurality of baseline information for one or more components to be monitored; b) receive a plurality of current images of each component to be monitored; c) detect a deviation from baseline based on a comparison of the plurality of images and to the plurality of baseline information; d) execute at least one classification model to generate a classification of the deviation; e) determine an amount of deviation based on the classification of the deviation; and f) activate at least one mitigation system based on the determined amount of deviation.

In the exemplary embodiment, device sensors 318 can be any sensor capable of measuring a desired operating condition of the device. Examples of device sensors 318 include, but are not limited to only including, resonant sensors, such as gyroscopes, accelerometers, and pressure sensors, environmental sensors that measure environmental attributes, and system sensors, that measure system attributes. Examples of environmental attributes may include external temperature, humidity, and/or acceleration in the case of a jet turbine. Examples of system attributes for a turbine 100 and/or 150 include revolutions per minute (RPM), vibration, and internal temperature. In the exemplary embodiment, device sensors 318 are in communication with the DMS server 320 and/or the device control system 410. Device sensors 318 connect to the DMS server 320 and/or the device control system 410 through many interfaces including without limitation a network, such as a local area network (LAN) or a wide area network (WAN), dial-in-connections, cable modems, Internet connection, wireless, and special high-speed Integrated Services Digital Network (ISDN) lines. Device sensors 318 receive data about conditions of the device, such as turbine 100 and 1500 and report those conditions to the DMS server 320 and/or the device control system 410.

In the exemplary embodiment, DMS computer device 320 (also known as DMS server 320) is a computer that includes a web browser or a software application, which enables DMS server 320 to communicate with client devices 328 device control systems 410, optical sensors 405, and/or device sensors 318 using the Internet, a local area network (LAN), and/or a wide area network (WAN). In some embodiments, the DMS server 320 is communicatively coupled to the Internet through many interfaces including, but not limited to, at least one of a network, such as the Internet, a LAN, a WAN, or an integrated services digital network (ISDN), a dial-up-connection, a digital subscriber line (DSL), a cellular phone connection, a satellite connection, and a cable modem. DMS server 320 can be any device capable of accessing a network, such as the Internet, including, but not limited to, a desktop computer, a laptop computer, a personal digital assistant (PDA), a cellular phone, a smartphone, a tablet, a phablet, wearable electronics, smart watch, virtual headsets or glasses (e.g., AR (augmented reality), VR (virtual reality), or XR (extended reality) headsets or glasses), chat bots, voice bots, ChatGPT bots or ChatGPT-based bots, or other web-based connectable equipment or mobile devices.

In the exemplary embodiment, mitigation systems 326 are system(s) that are programmed to correct and/or to prevent accumulation and/or accretion of undesirable material on components of devices. In the exemplary embodiment, mitigation systems 326 communicate with the DMS server 320 and/or the device control system 410, and are coupled to the DMS server 320 and/or the device control system 410, such as through many interfaces including, without limitation, a network, such as a local area network (LAN) or a wide area network (WAN), dial-in-connections, cable modems, Internet connection, wireless, and/or special high-speed Integrated Services Digital Network (ISDN) lines.

In the exemplary embodiment, client devices 328 are computers that include a web browser or a software application, which enables client devices 328 to communicate with DMS server 320 and/or device control system 410 using the Internet, a local area network (LAN), or a wide area network (WAN). In some embodiments, the client devices 328 are communicatively coupled to the Internet through many interfaces including, but not limited to, at least one of a network, such as the Internet, a LAN, a WAN, or an integrated services digital network (ISDN), a dial-up-connection, a digital subscriber line (DSL), a cellular phone connection, a satellite connection, and a cable modem. Client devices 328 can be any device capable of accessing a network, such as the Internet, including, but not limited to, a desktop computer, a laptop computer, a personal digital assistant (PDA), a cellular phone, a smartphone, a tablet, a phablet, wearable electronics, smart watch, virtual headsets or glasses (e.g., AR (augmented reality), VR (virtual reality), or XR (extended reality) headsets or glasses), chat bots, voice bots, ChatGPT bots or ChatGPT-based bots, or other web-based connectable equipment or mobile devices.

In the exemplary embodiment, an optical sensor 405 communicates with the DMS server 320 and provides images of one or more components of a device to the DMS server 320. The optical sensor 405 includes, but is not limited to, a camera, an IR camera, a spectroscope, and/or any other optical sensor 405 that enables systems 300 and 400 to function as described herein. In the exemplary embodiment, optical sensor 405 is similar to camera 316 (shown in FIG. 3). In the exemplary embodiment, optical sensor 405 is capable of communicating with DMS server 320 using the Internet, a local area network (LAN), or a wide area network (WAN). In some embodiments, the optical sensors 405 are communicatively coupled to the Internet through many interfaces including, but not limited to, at least one of a network, such as the Internet, a LAN, a WAN, or an integrated services digital network (ISDN), a dial-up-connection, a digital subscriber line (DSL), a cellular phone connection, a satellite connection, and a cable modem.

Device control system 410 may be any system that controls a device, such as turbine 100 and 150 (shown in FIGS. 1 and 2). The device control system 410 is in communication with the DMS server 320 and receives turbine sensor data 322. Device control system 410 may be similar to turbine control system 324. In the example embodiment, device control systems 410 are computers that include a web browser or a software application, which enables device control systems 410 to communicate with client devices 328 and DMS server 320 using the Internet, a local area network (LAN), or a wide area network (WAN). In some embodiments, the device control systems 410 are communicatively coupled to the Internet through many interfaces including, but not limited to, at least one of a network, such as the Internet, a LAN, a WAN, or an integrated services digital network (ISDN), a dial-up-connection, a digital subscriber line (DSL), a cellular phone connection, a satellite connection, and a cable modem. Device control systems 410 can be any device capable of accessing a network, such as the Internet, including, but not limited to, a desktop computer, a laptop computer, a personal digital assistant (PDA), a cellular phone, a smartphone, a tablet, a phablet, wearable electronics, smart watch, virtual headsets or glasses (e.g., AR (augmented reality), VR (virtual reality), or XR (extended reality) headsets or glasses), chat bots, voice bots, ChatGPT bots or ChatGPT-based bots, or other web-based connectable equipment or mobile devices.

A database server 415 is communicatively coupled to a database 420 that stores data. In one embodiment, the database 420 is a database that includes one or more detection, classification, and/or quantification models, thresholds, and/or baseline information. In some embodiments, the database 420 is stored remotely from the DMS server 320. In some embodiments, the database 420 is decentralized. In the example embodiment, a person can access the database 420 via the client devices 328 by logging onto DMS server 320.

Figure 5:
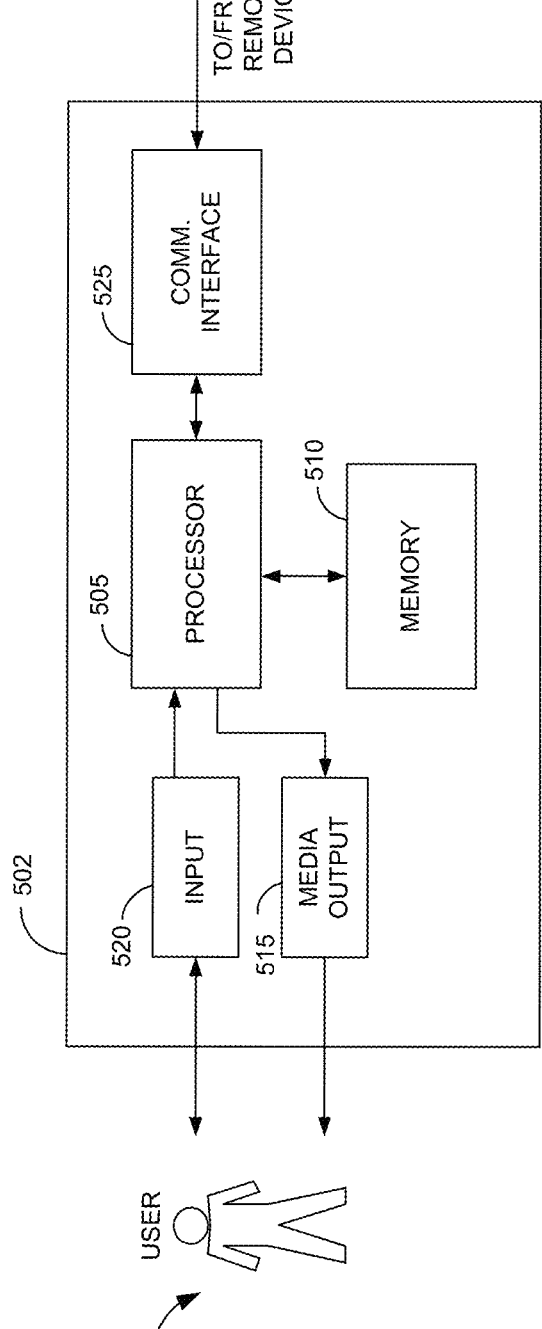
FIG. 5 illustrates an exemplary configuration of an exemplary user computer device, in accordance with one embodiment of the present disclosure.

FIG. 5 depicts an exemplary configuration 500 of user computer device 502, in accordance with one embodiment of the present disclosure. In the exemplary embodiment, user computer device 502 may be similar to, or the same as, client device 328 and DMS computer device 320 (both shown in FIG. 3). User computer device 502 may be operated by a user 501.

User computer device 502 may include a processor 505 for executing instructions. In some embodiments, executable instructions may be stored in a memory area 510. Processor 505 may include one or more processing units (e.g., in a multi-core configuration). Memory area 510 may be any device allowing information such as executable instructions and/or transaction data to be stored and retrieved. Memory area 510 may include one or more computer readable media.

User computer device 502 may also include at least one media output component 515 for presenting information to user 501. Media output component 515 may be any component capable of conveying information to user 501. In some embodiments, media output component 515 may include an output adapter (not shown) such as a video adapter and/or an audio adapter. An output adapter may be operatively coupled to processor 505 and operatively couplable to an output device such as a display device (e.g., a cathode ray tube (CRT), liquid crystal display (LCD), light emitting diode (LED) display, or "electronic ink" display) or an audio output device (e.g., a speaker or headphones).

In some embodiments, media output component 515 may be configured to present a graphical user interface (e.g., a web browser and/or a client application) to user 501. A graphical user interface may include, for example, an interface for viewing information provided by the device control system 410 (shown in FIG. 4). In some embodiments, user computer device 502 may include an input device 520 for receiving input from user 501. User 501 may use the input device 520 to, without limitation, provide information either through speech or typing.

Input device 520 may include, for example, a keyboard, a pointing device, a mouse, a stylus, a touch sensitive panel (e.g., a touch pad or a touch screen), a gyroscope, an accelerometer, a position detector, a biometric input device, and/or an audio input device. A single component such as a touch screen may function as both an output device of media output component 515 and input device 520.

User computer device 502 may also include a communication interface 525, communicatively coupled to a remote device such as DMS server 320. Communication interface 525 may include, for example, a wired or wireless network adapter and/or a wireless data transceiver for use with a mobile telecommunications network.

Stored in memory area 510 are, for example, computer readable instructions for providing a user interface to user 501 via media output component 515 and, optionally, receiving and processing input from input device 520. A user interface may include, among other possibilities, a web browser and/or a client application. Web browsers enable users, such as user 501, to display and interact with media and other information typically embedded on a web page or a website from DMS server 320. A client application may enable user 501 to interact with, for example, DMS server 320. For example, instructions may be stored by a cloud service, and the output of the execution of the instructions sent to the media output component 515.

Figure 6:
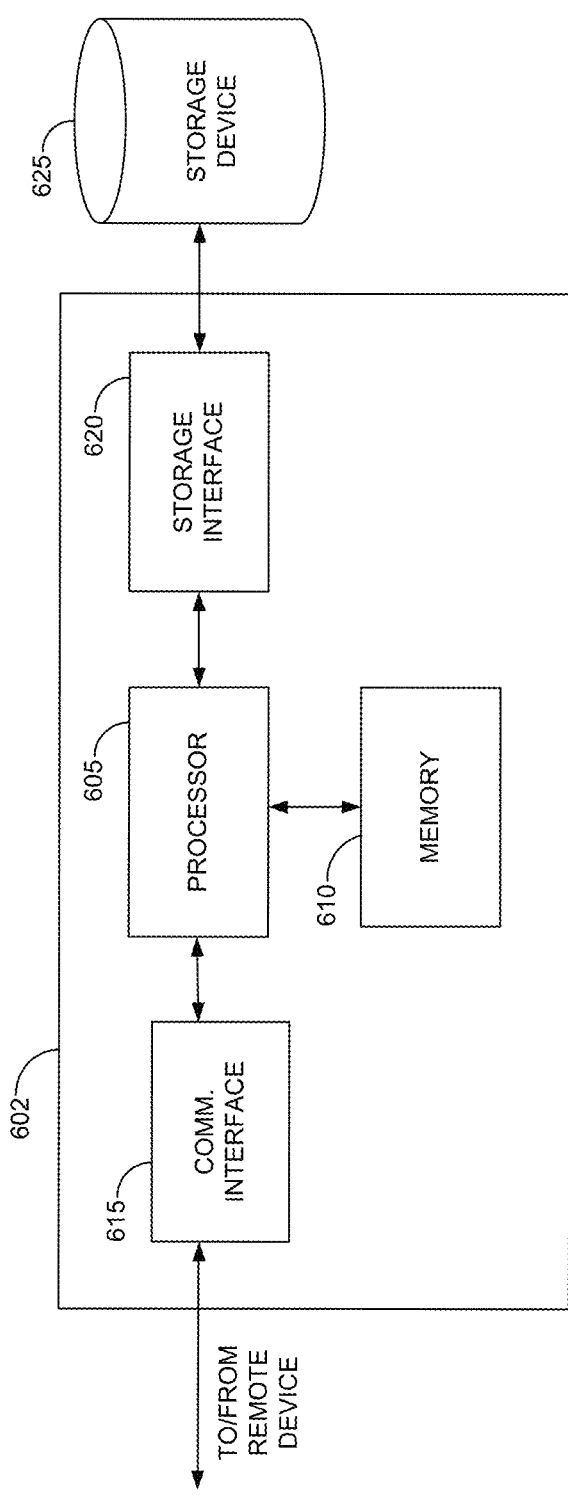
FIG. 6 illustrates an exemplary configuration of a server computer device, in accordance with one embodiment of the present disclosure.

FIG. 6 depicts an exemplary configuration 600 of a server computer device 602, in accordance with one embodiment of the present disclosure. In the exemplary embodiment, server computer device 602 may be similar to, or the same as, DMS server 320, turbine control system 324 (both shown in FIG. 3), device control system 410, and database server 415 (both shown in FIG. 4). Server computer device 602 may also include a processor 605 for executing instructions.

Instructions may be stored in a memory area 610. Processor 605 may include one or more processing units (e.g., in a multi-core configuration).

Processor 605 may be operatively coupled to a communication interface 615 such that server computer device 602 is capable of communicating with a remote device such as another server computer device 602, DMS server 320, mitigation system 326, and client devices 328 (both shown in FIG. 3) (for example, using wireless communication or data transmission over one or more radio links or digital communication channels). For example, communication interface 615 may receive images from optical sensor 405 (shown in FIG. 4) via the Internet, as illustrated in FIG. 4.

Processor 605 may also be operatively coupled to a storage device 625. Storage device 625 may be any computer-operated hardware suitable for storing and/or retrieving data, such as, but not limited to, data associated with one or more models. In some embodiments, storage device 625 may be integrated in server computer device 602. For example, server computer device 602 may include one or more hard disk drives as storage device 625.

In other embodiments, storage device 625 may be external to server computer device 602 and may be accessed by a plurality of server computer devices 602. For example, storage device 625 may include a storage area network (SAN), a network attached storage (NAS) system, and/or multiple storage units such as hard disks and/or solid-state disks in a redundant array of inexpensive disks (RAID) configuration.

In some embodiments, processor 605 may be operatively coupled to storage device 625 via a storage interface 620. Storage interface 620 may be any component capable of providing the processor 605 with access to storage device 625. Storage interface 620 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processor 605 with access to storage device 625.

Processor 605 may execute computer-executable instructions for implementing aspects of the disclosure. In some embodiments, the processor 605 may be transformed into a special purpose microprocessor by executing computer-executable instructions or by otherwise being programmed. For example, the processor 605 may be programmed with the instruction such as illustrated in FIGS. 7 and 8.

Figure 7:
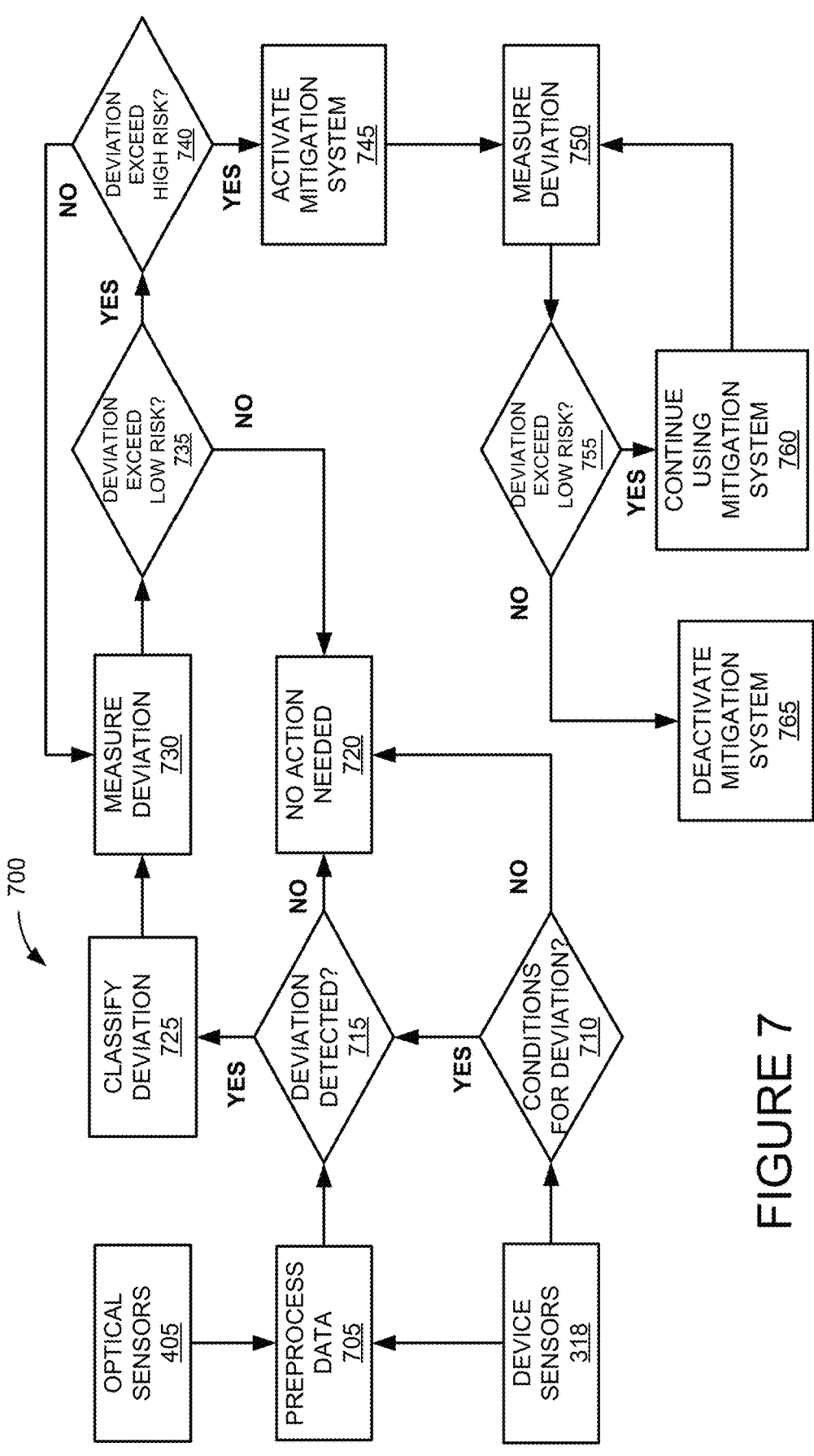
FIG. 7 illustrates an exemplary process of monitoring for deviations using the systems shown in FIGS. 3 and 4.
Figure 8:
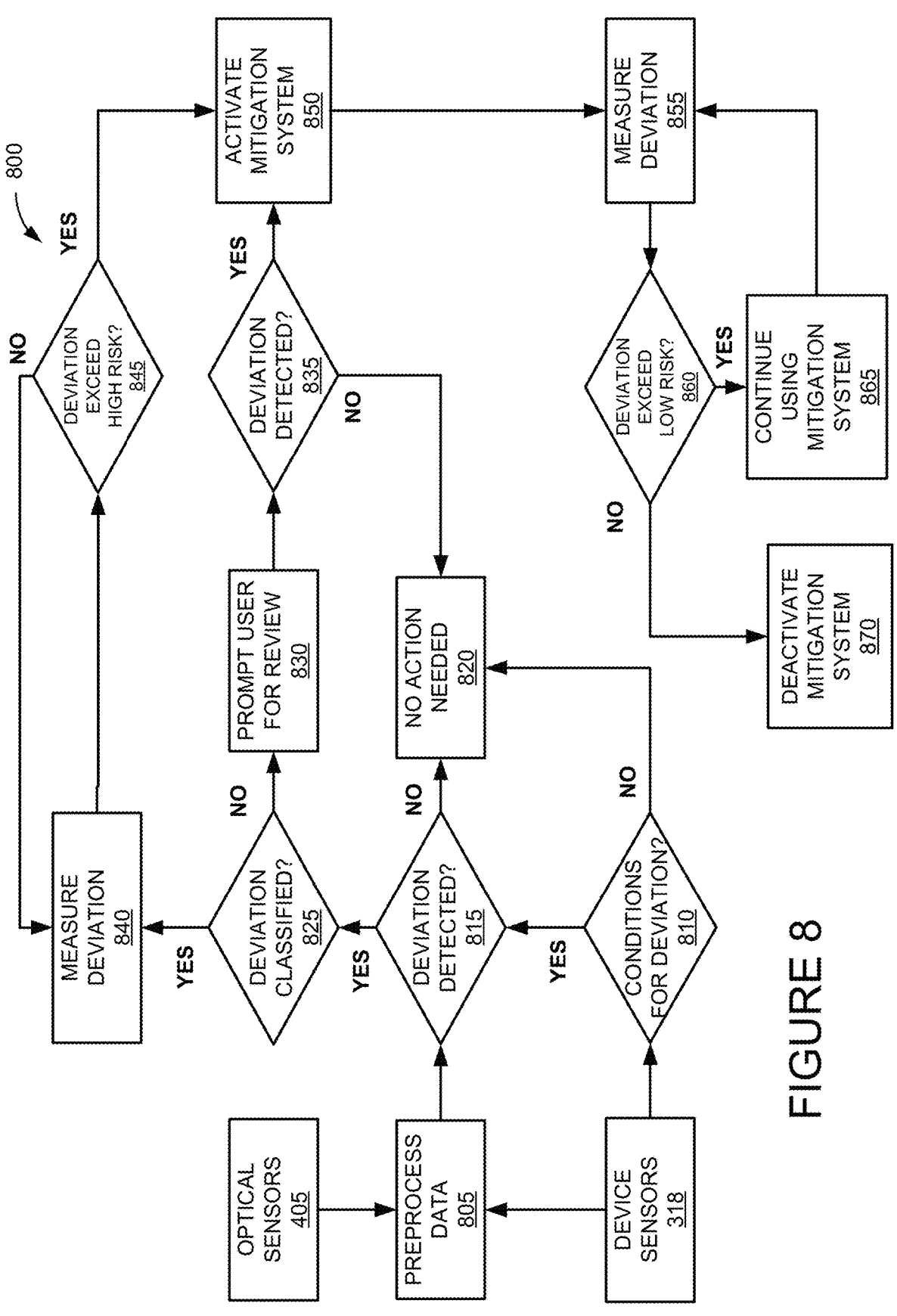
FIG. 8 illustrates another exemplary process of monitoring for deviations using the systems shown in FIGS. 3 and 4.

FIG. 7 illustrates an exemplary process 700 of monitoring for deviations using the systems 300 and 400 (shown in FIGS. 3 and 4). In the exemplary embodiment, process 700 is performed by DMS server 320 (shown in FIG. 3).

In the exemplary embodiment, the DMS server 320 receives a plurality of images from the optical sensors 405. The DMS server 320 also receives a plurality of sensor data transmitted from the device sensors 318. In the exemplary embodiment, the DMS server 320 pre-processes 705 the plurality of images and the plurality of sensor data to prepare the information for process 700. In at least some embodiment, the DMS server 320 also analyzes the plurality of sensor data transmitted from the device sensors 318 to determine 710 if the conditions are right for deviations to occur. For example, if the temperature and/or humidity is outside of a predefined range where ice accumulation may form, then the DMS server 320 determines 710 that conditions are not right for deviations to occur, and determines 720 that no action is needed other than continuous monitoring.

If the conditions are present such that deviations may occur, i.e., the temperature and/or the humidity are within the ranges wherein such accumulation may occur, the DMS server 320 analyzes the plurality of images and the plurality of sensor data to determine 715 if any deviation is detected. In at least one embodiment, the DMS server 320 determines 715 if there are any deviations or changes in the plurality of images from the baseline for the components being analyzed. In at least one embodiment, the DMS server 320 performs a pixel-by-pixel comparison of the plurality of images to determine 715 if any deviations are detected. If no deviations are detected, then the DMS server 320 determines 720 that no action is needed and continues monitoring the process 700.

If deviation is detected 715, the DMS server 320 classifies 725 the deviation. In at least one embodiment, the DMS server 320 executes one or more models to analyze the detected deviation to classify 725 the deviation. The one or more models have been continuously updated and trained to enable different types of deviations, including deviations of different materials to be reliably detected. Exemplary deviations may include, but are not limited to only including, accretion and/or accumulation of foreign material, such as, but not limited to, ice, snow, dirt, dust, and/or oil; damage to one or more parts of the machine; a calibration need for one or more parts of the machine; missing components or portions of components of the machine; leakage present; and/or other variations and/or deviations from the baseline of a machine and/or device.

The DMS server 320 measures 730 the amount of deviation present. In at least one embodiment, the DMS server 320 uses the number of pixels of deviation detected and the classification to measure 730 the amount of deviation present. Then the DMS server 320 compares 735 and 740 the amount of deviation present to one or more thresholds. In some embodiments, the thresholds are predefined by one or more users. In still further embodiments, the thresholds are different for different types of deviations. The DMS server 320 determines 735 if the deviation exceeds a low-risk threshold. If the deviation does not exceed the low-risk threshold, then the DMS server 320 determines 720 that no action is needed and continues monitoring the process 700. If the deviation does exceed the low-risk threshold, then the DMS server 320 determines 740 if the deviation exceeds the high-risk threshold. If the deviation does not exceed the high-risk threshold, the DMS server 320 continues to measure 730 the deviation.

If the deviation exceeds the high-risk threshold, the DMS server 320 activates 745 the mitigation system 326 (shown in FIG. 3). In at least one embodiment, after activating 745 the mitigation system 326, the DMS server 320 continues to measure 750 the deviation. The DMS server 320 determines 755 if the deviation still exceeds the low-risk threshold. If the deviation still exceeds the low-risk threshold, the DMS server 320 continues using 760 the mitigation system 326. If the deviation no longer exceeds the low-risk threshold, the DMS server 320 deactivates 765 the mitigation system 326.

In the exemplary embodiment, process 700 is continuously repeated by the DMS server 320 based on images received from the optical sensors 405. In some embodiments, the DMS server 320 analyzes a plurality of images substantially simultaneously in the determination process 700. In these embodiments, the DMS server 320 analyzes images from a sliding window of time. For example, the sliding window of time may be 30 seconds, 500 seconds, and/or any other window of time that enables the system to work as described herein.

In some embodiments, multiple corrective actions are available, and the DMS server 320 determines which corrective action to take. In some embodiments, the DMS server 320 determines that a corrective action is insufficient and stops that corrective action and initiates a new corrective action.

FIG. 8 illustrates another exemplary process 800 of monitoring for deviations using the systems 300 and 400 (shown in FIGS. 3 and 4). In the exemplary embodiment, process 800 is performed by DMS server 320 (shown in FIG. 3). While process 700 is a closed-loop process in the exemplary embodiment, process 800 is an open loop that allows for user review of the decisions recommended by the DMS server 320. In at least one embodiment, the DMS server 320 communicates with one or more client devices 328 (shown in FIG. 3) capable of providing information to, and receiving input from, a user.

In the exemplary embodiment, the DMS server 320 receives a plurality of images from the optical sensors 405. The DMS server 320 also receives a plurality of sensor data from the device sensors 318. In the exemplary embodiment, the DMS server 320 pre-processes 805 the plurality of images and the plurality of sensor data to prepare the information for process 700. In at least some embodiment, the DMS server 320 also analyzes the plurality of sensor data from the device sensors 318 to determine 810 if the conditions are right for deviations to occur. For example, if the temperature and/or humidity are outside of the predefined range wherein ice accumulation may form, then the DMS server 320 determines 810 that present conditions are not within the range of operating temperatures and/or humidity where deviations may occur. The DMS server 320 then determines 820 that no action is needed and continues monitoring the process 800.

If the conditions are right for deviations to occur, the DMS server 320 analyzes the plurality of images and the plurality of sensor data to determine 815 if any deviation is detected. In at least one embodiment, the DMS server 320 determines 815 if there are any deviations or changes in the plurality of images from the baseline for the components being analyzed. In at least one embodiment, the DMS server 320 performs a pixel-by-pixel review of the plurality of images to determine 815 if any deviations are detected. If no deviations are detected, then the DMS server 320 determines 820 that no action is needed and continues monitoring the process 800.

If deviation is detected 815, the DMS server 320 determines 825 if it can classify the deviation. In at least one embodiment, the DMS server 320 executes one or more models to analyze the detected deviation to classify the deviation. The one or more models are continuously updated to enable different types of deviations, including deviations of different materials to be reliably classified. Exemplary deviations may include, but are not limited to only including, accretion and/or accumulation of foreign material, such as, but not limited to, ice, snow, dirt, dust, and/or oil; damage to one or more parts of the machine; a calibration need for one or more parts of the machine; missing parts of the machine; leaks; and/or other variations and/or deviations from the baseline of a machine and/or device. If the DMS server 320 is unable to classify the deviation, the DMS server 320 prompts 830 the user for review. The DMS server 320 provides information to the user to enable the user to determine a classification for the deviation. The user returns their review and the DMS server 320 determines 835 if a deviation is still detected. The user may review the classification information from the DMS server 320 and determine that no deviation exists. The DMS server 320 then determines 820 that no action is needed and continues monitoring the process 800. In at least one embodiment, the user review also includes whether or not to activate the mitigation system 326 (shown in FIG. 3). If deviation is still detected after the user review, the DMS server 320 activates the mitigation system 326.

If the DMS server 320 classifies the deviation, the DMS server 320 measures 830 the amount of deviation present. In at least one embodiment, the DMS server 320 uses the number of pixels of deviation detected and the classification to measure 830 the amount of deviation present. The DMS server 320 then compares 845 the amount of deviation present to one or more thresholds. In some embodiments, the thresholds are predefined by one or more users. In still further embodiments, the thresholds are different for different types of deviations. The DMS server 320 determines 845 if the deviation exceeds a high-risk threshold. If the deviation does not exceed the high-risk threshold, the DMS server 320 continues monitoring process 800 by measuring 840 the deviation.

If the deviation exceeds the high-risk threshold or a deviation is detected after a user review, the DMS server 320 activates 850 the mitigation system 326. In at least one embodiment, after activating 850 the mitigation system 326, the DMS server 320 continues to measure 855 the deviation. The DMS server 320 determines 860 if the deviation detected still exceeds the low-risk threshold. If the deviation still exceeds the low-risk threshold, the DMS server 320 continues using 865 the mitigation system 326. If the deviation no longer exceeds the low-risk threshold, the DMS server 320 deactivates 870 the mitigation system 326.

In the exemplary embodiment, process 700 is continuously repeated by the DMS server 320 based on images received from the optical sensors 405. In some embodiments, the DMS server 320 analyzes a plurality of images substantially simultaneously in the determination process 800. In such embodiments, the DMS server 320 analyzes images transmitted from a sliding window of time. For example, the sliding window of time may be 30 seconds, 500 seconds, and/or any other window of time that enables the system to work as described herein.

Figure 9:
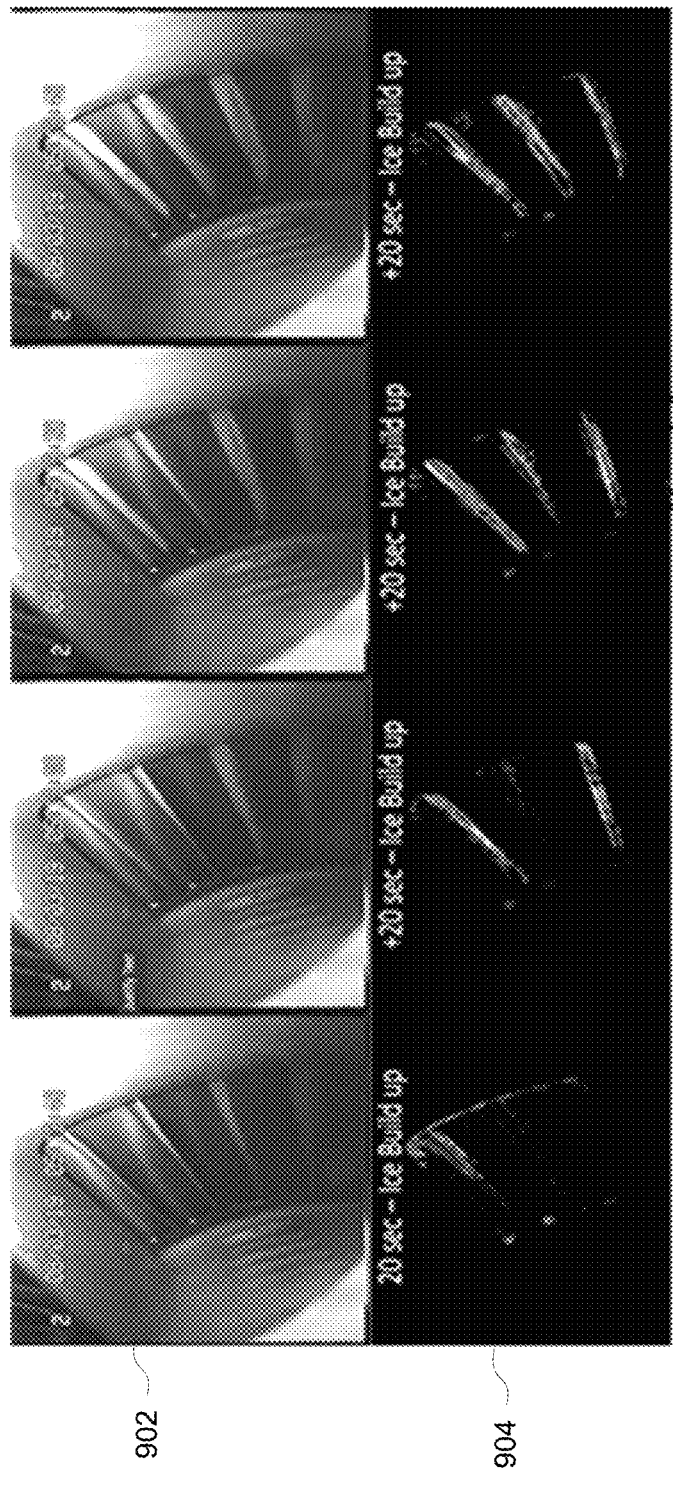
FIG. 9 illustrates a plurality of images and the corresponding deviations using the systems shown in FIGS. 3 and 4.

FIG. 9 illustrates a plurality of images 902 and the corresponding deviation images 904 using the systems 300 and 400 (shown in FIGS. 3 and 4). The images 902 may be provided by the camera 316 (shown in FIG. 3) and/or the optical sensors 405. For each of the images 902, the DMS server 320 (shown in FIG. 3) determines 715 if there is any deviation detected (shown in FIG. 7). The deviation images 904 graphically illustrate the detected deviations. The DMS server 320 uses the deviation images 904 to classify 725 the deviation (shown in FIG. 7). Furthermore, the DMS server 320 counts the number of pixels in the deviation images 904 to measure 730 the deviation (shown in FIG. 7).

Machine Learning and Other Matters

The computer-implemented methods discussed herein may include additional, or alternative actions, including those discussed elsewhere herein. The methods may be implemented via one or more local or remote processors, transceivers, servers, and/or sensors (such as processors, transceivers, servers, and/or sensors mounted on vehicles or mobile devices, or associated with smart infrastructure or remote servers), and/or via computer-executable instructions stored on non-transitory computer-readable media or medium.

In some embodiments, DMS server 320 is programmed to implement machine learning, such that DMS server 320

"learns" to analyze, organize, and/or process data without being explicitly programmed to do so. Machine learning may be implemented through machine learning methods and algorithms ("ML methods and algorithms"). In an exemplary embodiment, a machine learning module ("ML module") is configured to implement ML methods and algorithms. In some embodiments, ML methods and algorithms are applied to data inputs and generate machine learning outputs ("ML outputs"). Data inputs may include but are not limited to images. ML outputs may include, but are not limited to identified objects, items classifications, material detection, material classification, material quantification, and/or other data extracted from the images. In some embodiments, data inputs may include certain ML outputs.

In some embodiments, at least one of a plurality of ML methods and algorithms may be applied, which may include but are not limited to: linear or logistic regression, instance-based algorithms, regularization algorithms, decision trees, Bayesian networks, cluster analysis, association rule learning, artificial neural networks, deep learning, combined learning, reinforced learning, dimensionality reduction, and support vector machines. In various embodiments, the implemented ML methods and algorithms are directed toward at least one of a plurality of categorizations of machine learning, such as supervised learning, unsupervised learning, and reinforcement learning.

In one embodiment, the ML module employs supervised learning, which involves identifying patterns in existing data to make predictions about subsequently received data. Specifically, the ML module is "trained" using training data, which includes example inputs and associated example outputs. Based upon the training data, the ML module may generate a predictive function which maps outputs to inputs and may utilize the predictive function to generate ML outputs based upon data inputs. The example inputs and example outputs of the training data may include any of the data inputs or ML outputs described above. In the exemplary embodiment, a processing element may be trained by providing it with a large sample of images with known characteristics or features. Such information may include, for example, information associated with a plurality of images of a plurality of different objects, items, and/or property.

In another embodiment, a ML module may employ unsupervised learning, which involves finding meaningful relationships in unorganized data. Unlike supervised learning, unsupervised learning does not involve user-initiated training based upon example inputs with associated outputs. Rather, in unsupervised learning, the ML module may organize unlabeled data according to a relationship determined by at least one ML method/algorithm employed by the ML module. Unorganized data may include any combination of data inputs and/or ML outputs as described above.

In yet another embodiment, a ML module may employ reinforcement learning, which involves optimizing outputs based upon feedback from a reward signal. Specifically, the ML module may receive a user-defined reward signal definition, receive a data input, utilize a decision-making model to generate a ML output based upon the data input, receive a reward signal based upon the reward signal definition and the ML output, and alter the decision-making model so as to receive a stronger reward signal for subsequently generated ML outputs. Other types of machine learning may also be employed, including deep or combined learning techniques.

Based upon these analyses, the processing element may learn how to identify characteristics and patterns that may then be applied to analyzing images of components for and identifying deviations from baseline. The processing element may also learn how to identify attributes of different objects in different lighting and/or other conditions. This information may be used to determine which classification models to use and which classifications to provide.

ADDITIONAL CONSIDERATIONS

As will be appreciated based upon the foregoing specification, the above-described embodiments of the disclosure may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps," or code) include machine instructions for a programmable processor and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

As used herein, the term "database" can refer to either a body of data, a relational database management system (RDBMS), or to both. As used herein, a database can include any collection of data including hierarchical databases, relational databases, flat file databases, object-relational databases, object-oriented databases, and any other structured collection of records or data that is stored in a computer system. The above examples are example only, and thus are not intended to limit in any way the definition and/or meaning of the term database. Examples of RDBMS' include, but are not limited to including, Oracle® Database, MySQL, IBM® DB2, Microsoft® SQL Server, Sybase®, and PostgreSQL. However, any database can be used that enables the systems and methods described herein. (Oracle is a registered trademark of Oracle Corporation, Redwood Shores, California; IBM is a registered trademark of International Business Machines Corporation, Armonk, New York; Microsoft is a registered trademark of Microsoft Corporation, Redmond, Washington; and Sybase is a registered trademark of Sybase, Dublin, California.)

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only and are thus not intended to limit in any way the definition and/or meaning of the term "processor."

As used herein, the terms "software" and "firmware" are interchangeable and include any computer program stored in memory for execution by a processor, including RAM memory, ROM memory, EPROM memory, EEPROM memory, and non-volatile RAM (NVRAM) memory. The above memory types are example only and are thus not limiting as to the types of memory usable for storage of a computer program.

In another example, a computer program is provided, and the program is embodied on a computer-readable medium. In an example, the system is executed on a single computer system, without requiring a connection to a server computer. In a further example, the system is being run in a Windows® environment (Windows is a registered trademark of Microsoft Corporation, Redmond, Washington). In yet another example, the system is run on a mainframe environment and a UNIX® server environment (UNIX is a registered trademark of X/Open Company Limited located in Reading, Berkshire, United Kingdom). In a further example, the system is run on an iOS® environment (iOS is a registered trademark of Cisco Systems, Inc. located in San Jose, CA). In yet a further example, the system is run on a Mac OS® environment (Mac OS is a registered trademark of Apple Inc. located in Cupertino, CA). In still yet a further example, the system is run on Android® OS (Android is a registered trademark of Google, Inc. of Mountain View, CA). In another example, the system is run on Linux® OS (Linux is a registered trademark of Linus Torvalds of Boston, MA). The application is flexible and designed to run in various different environments without compromising any major functionality.

In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

As used herein, an element or step recited in the singular and proceeded with the word "a" or "an" should be understood as not excluding plural elements or steps, unless such exclusion is explicitly recited. Furthermore, references to "example" or "one example" of the present disclosure are not intended to be interpreted as excluding the existence of additional examples that also incorporate the recited features. Further, to the extent that terms "includes," "including," "has," "contains," and variants thereof are used herein, such terms are intended to be inclusive in a manner similar to the term "comprises" as an open transition word without precluding any additional or other elements.

Furthermore, as used herein, the term "real-time" refers to at least one of the time of occurrence of the associated events, the time of measurement and collection of predetermined data, the time to process the data, and the time of a system response to the events and the environment. In the examples described herein, these activities and events occur substantially instantaneously.

The patent claims at the end of this document are not intended to be construed under 35 U.S.C. § 112(f) unless traditional means-plus-function language is expressly recited, such as "means for" or "step for" language being expressly recited in the claim(s).

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

Further aspects of the invention are provided by the subject matter of the following clauses:

A system for monitoring at least one component using at least one processor in communication with at least one memory device, wherein the at least one processor is programmed to: store a plurality of baseline information associated with the at least one component to be monitored; receive a plurality of current images of the at least one component to be monitored; detect a deviation from baseline based upon a comparison of the plurality of current images and the plurality of baseline information; classify the deviation; and implement a corrective action based on the classification of deviation.

The system in accordance with any of the preceding clauses, wherein the at least one processor is further programmed to: determine an amount of deviation based on the comparison; and determine which of a plurality of corrective actions should be implemented.

The system in accordance with any of the preceding clauses, wherein the at least one processor is further programmed to: notify a user via a client device that a corrective action should be activated; receive a response from the user; and activate the corrective action based upon the user response.

The system in accordance with any of the preceding clauses, wherein the at least one processor is further programmed to activate at least one mitigation system when: the detected deviation is determined to be ice accumulation; and the determined amount of accumulation exceeds a predetermined threshold.

The system in accordance with any of the preceding clauses, wherein the at least one processor is further programmed to: monitor an amount of deviation detected during activation of the at least one mitigation system; and deactivate the at least one mitigation system when a detected amount of deviation no longer exceeds a predetermined threshold.

The system in accordance with any of the preceding clauses, wherein the at least one processor is further programmed to receive additional sensor information from one or more sensors monitoring the at least one component.

The system in accordance with any of the preceding clauses, wherein the at least one processor is further programmed to determine whether conditions are appropriate for a deviation based on the additional sensor information received.

The system in accordance with any of the preceding clauses, wherein the at least one processor is further programmed to classify the deviation based on the additional sensor information received.

The system in accordance with any of the preceding clauses, wherein the at least one processor is further programmed to classify the deviation by a cause of the deviation.

The system in accordance with any of the preceding clauses, wherein the deviation is an accretion of material and wherein the deviation is classified by material.

The system in accordance with any of the preceding clauses, wherein the at least one component is a part of a turbine and wherein the plurality of current images are transmitted from a camera viewing a compressor through a window defined in an inlet plenum.

A method for monitoring at least one component within a device, the method implemented on a computer system including at least one processor in communication with at least one memory device, the method comprising: storing a plurality of baseline information associated with the at least one component to be monitored; receiving a plurality of current images of the at least one component to be monitored; detecting a deviation from baseline based upon the plurality of current images and the plurality of baseline information; classifying the deviation; and implementing a corrective action based on the classification of deviation.

The method in accordance with any of the preceding clauses, further comprising: determining an amount of deviation based on the comparison; and determining which of a plurality of corrective actions should be implemented.

The method in accordance with any of the preceding clauses, further comprising: notify a user via a client device that a corrective action should be activated; receiving a response from the user; and activating the corrective based upon the response.

The method in accordance with any of the preceding clauses, further comprising activate at least one mitigation system when: the detected deviation is determined to be ice accumulation; and the determined amount of accumulation exceeds a predetermined threshold.

The method in accordance with any of the preceding clauses, further comprising: monitoring an amount of deviation detected during activation of the at least one mitigation system; and deactivating the at least one mitigation system when a detected amount of deviation no longer exceeds a predetermined threshold.

The method in accordance with any of the preceding clauses, further comprising receiving additional sensor information from one or more sensors monitoring the device.

The method in accordance with any of the preceding clauses, further comprising determining whether conditions are appropriate for a deviation based on the additional sensor information received.

The method in accordance with any of the preceding clauses, further comprising classify the deviation based on the additional sensor information received.

The method in accordance with any of the preceding clauses, wherein the device is a turbine and wherein the plurality of current images are transmitted from a camera viewing a compressor through a window defined in an inlet plenum.

While the invention has been described in terms of various specific embodiments, those skilled in the art will recognize that the invention can be practiced with modification within the spirit and scope of the claims.

What is claimed is:

1. A system for monitoring at least one component using at least one processor in communication with at least one memory device, wherein the at least one processor is programmed to:

store a plurality of baseline information associated with the at least one component to be monitored;

receive a plurality of current images of the at least one component to be monitored;

detect a deviation from baseline based upon a comparison of the plurality of current images and the plurality of baseline information;

receive contextual sensor information from one or more sensors measuring internal operational parameters of the component to be monitored, wherein the internal operational parameters are separate from the deviation;

execute a machine-learning trained model to classify the deviation, wherein the machine-learning trained model is trained to classify deviations and identify a material of the deviation based upon the plurality of baseline information, the contextual sensor information received, and a plurality of historical images of the at least one component to be monitored; and implement a corrective action based on the classification of deviation.

2. The system of claim 1, wherein the at least one processor is further programmed to:

determine an amount of deviation based on the comparison; and determine which of a plurality of corrective actions should be implemented.

3. The system of claim 1, wherein the at least one processor is further programmed to:

notify a user via a client device that a corrective action should be activated;

receive a response from the user; and activate the corrective action based upon the user response.

4. The system of claim 1, wherein the at least one processor is further programmed to activate at least one mitigation system when:

the detected deviation is determined to be ice accumulation; and the determined amount of accumulation exceeds a predetermined threshold.

5. The system of claim 4, wherein the at least one processor is further programmed to:

monitor an amount of deviation detected during activation of the at least one mitigation system; and deactivate the at least one mitigation system when a detected amount of deviation no longer exceeds a predetermined threshold.

6. The system of claim 1, wherein the at least one processor is further programmed to receive environmental sensor information from one or more sensors monitoring an environment of the at least one component including at least one of temperature and humidity of the environment of the at least one component.

7. The system of claim 6, wherein the at least one processor is further programmed to determine whether the deviation may occur based on environmental conditions based on the environmental sensor information received including at least one of temperature and humidity.

8. The system of claim 1, wherein the at least one processor is further programmed to classify the deviation by a cause of the deviation, wherein the cause of the deviation includes at least one of damage to one or more parts of the machine, a calibration need for one or more parts of the machine, missing components or portions of components of the machine, and leakage present.

9. The system of claim 1, wherein the deviation is an accretion of material and wherein the material includes at least one of dirt, dust, and oil.

10. The system of claim 1, wherein the at least one component is a part of a turbine and wherein the plurality of current images are transmitted from a camera viewing a compressor through a window defined in an inlet plenum.

11. A method for monitoring at least one component within a device, the method implemented on a computer system including at least one processor in communication with at least one memory device, the method comprising:

storing a plurality of baseline information associated with the at least one component to be monitored;

receiving a plurality of current images of the at least one component to be monitored;

detecting a deviation from baseline based upon the plurality of current images and the plurality of baseline information;

receiving contextual sensor information from one or more sensors measuring internal operational parameters of the component to be monitored, wherein the internal operational parameters are separate from the deviation;

executing a machine-learning trained model to classify the deviation, wherein the machine-learning trained model is trained to classify deviations and identify a material of the deviation based upon the plurality of baseline information, the contextual sensor information received, and a plurality of historical images of the at least one component to be monitored; and implementing a corrective action based on the classification of deviation.

12. The method of claim 11 further comprising:

determining an amount of deviation based on the comparison; and determining which of a plurality of corrective actions should be implemented.

13. The method of claim 11 further comprising:

notify a user via a client device that a corrective action should be activated;

receiving a response from the user; and activating the corrective based upon the response.

14. The method of claim 11 further comprising activate at least one mitigation system when:

the detected deviation is determined to be ice accumulation; and the determined amount of accumulation exceeds a predetermined threshold.

15. The method of claim 14 further comprising:

monitoring an amount of deviation detected during activation of the at least one mitigation system; and deactivating the at least one mitigation system when a detected amount of deviation no longer exceeds a predetermined threshold.

16. The method of claim 11 further comprising receiving environmental sensor information from one or more sensors monitoring an environment of the device including at least one of temperature and humidity of the environment of the device.

17. The method of claim 16 further comprising determining whether the deviation may occur based on environmental conditions based on the environmental sensor information received including at least one of temperature and humidity.

18. The method of claim 11, wherein the device is a turbine and wherein the plurality of current images are transmitted from a camera viewing a compressor through a window defined in an inlet plenum.

19. The method of claim 11 further comprising classifying the deviation by a cause of the deviation, wherein the cause of the deviation includes at least one of damage to one or more parts of the machine, a calibration need for one or more parts of the machine, missing components or portions of components of the machine, and leakage present.

20. The method of claim 11, wherein the deviation is an accretion of material and wherein the material includes at least one of dirt, dust, and oil.

\* \* \* \* \*